(12) United States Patent
Gruenhagen

(10) Patent No.: US 12,214,679 B1
(45) Date of Patent: Feb. 4, 2025

(54) SELF-CONTAINED CHARGING SYSTEM FOR ELECTRIC VEHICLE BATTERY

(71) Applicant: Richard Gruenhagen, San Clemente, CA (US)

(72) Inventor: Richard Gruenhagen, San Clemente, CA (US)

( * ) Notice: Subject to any disclaimer, the term of this patent is extended or adjusted under 35 U.S.C. 154(b) by 0 days.

(21) Appl. No.: 18/641,328

(22) Filed: Apr. 19, 2024

(51) Int. Cl.
| | |
|---|---|
| *B60L 50/90* | (2019.01) |
| *B60L 50/60* | (2019.01) |
| *B60L 53/60* | (2019.01) |
| *G21H 1/06* | (2006.01) |
| *H02J 7/02* | (2016.01) |
| *H02J 7/34* | (2006.01) |

(52) U.S. Cl.
CPC .............. *B60L 50/90* (2019.02); *B60L 50/60* (2019.02); *B60L 53/60* (2019.02); *G21H 1/06* (2013.01); *H02J 7/02* (2013.01); *H02J 7/342* (2020.01); *B60L 2210/30* (2013.01)

(58) Field of Classification Search
CPC ...................................................... B60L 50/90
USPC ......................................................... 320/109
See application file for complete search history.

(56) References Cited

U.S. PATENT DOCUMENTS

| | | | | |
|---|---|---|---|---|
| 7,493,974 B1* | 2/2009 | Boncodin | ............... | B60K 16/00 180/2.2 |
| 2003/0233959 A1* | 12/2003 | Kumar | ............... | B60L 50/15 105/26.05 |
| 2007/0170910 A1* | 7/2007 | Chang | ............... | H01G 7/026 333/172 |
| 2011/0233990 A1* | 9/2011 | Boncodin | ............... | B60L 50/90 301/6.1 |
| 2012/0049792 A1* | 3/2012 | Crombez | ............... | H01M 10/44 320/109 |
| 2012/0306442 A1* | 12/2012 | Raghavan | ............... | H02J 7/00 320/109 |
| 2013/0263597 A1* | 10/2013 | Chauvin | ............... | H10N 10/13 136/202 |
| 2014/0021826 A1* | 1/2014 | Zafiropoulo | ............... | B60L 50/90 310/303 |
| 2018/0114890 A1* | 4/2018 | Chauvin | ............... | G21D 5/02 |
| 2019/0322180 A1* | 10/2019 | Song | ............... | B60L 58/31 |
| 2020/0274375 A1* | 8/2020 | Griffiths | ............... | H02J 7/24 |
| 2020/0411207 A1* | 12/2020 | Tillotson | ............... | G21H 1/00 |
| 2021/0152105 A1* | 5/2021 | Froelich | ............... | B60K 17/34 |

(Continued)

*Primary Examiner* — Jerry D Robbins
(74) *Attorney, Agent, or Firm* — PERKINS COIE LLP; Alberto Araiza; Benjamin Desch

(57) ABSTRACT

The technology includes an electric vehicle (EV) including a drivetrain system and a power system. The drivetrain system includes an electric motor configured to supply motive power to the EV and a drivetrain controller configured to control power supplied to the electric motor. The power system includes a primary battery configured to supply electric current to the drivetrain controller of the drivetrain system. The primary battery is rechargeable via a charging station. The power system also includes a trickle charger configured to supply a trickle charge to a component of the power system. The trickle charger is a self-contained source of electric current that is generated autonomously and is not rechargeable. The power system further includes a power management controller configured to manage electric current supplied from the trickle charger to the power system.

20 Claims, 3 Drawing Sheets

(56) References Cited

U.S. PATENT DOCUMENTS

| | | | |
|---|---|---|---|
| 2022/0281328 A1* | 9/2022 | Lewis | B60L 8/003 |
| 2023/0264585 A1* | 8/2023 | Abron | B60K 7/0007 307/10.1 |

* cited by examiner

SELF-CONTAINED CHARGING SYSTEM FOR ELECTRIC VEHICLE BATTERY

BACKGROUND

An electric car or electric vehicle (EV) is a passenger automobile that is propelled by an electric traction motor, using only energy stored in on-board batteries. Compared to conventional internal combustion engine (ICE) vehicles, electric cars are quieter, more responsive, have superior energy conversion efficiency and no carbon emissions and lower overall vehicle emissions. The term "electric car" normally refers to plug-in electric vehicle, typically a battery electric vehicle (BEV), but broadly may also include plug-in hybrid electric vehicle (PHEV), range-extended electric vehicle (REEV), and fuel cell electric vehicle (FCEV).

BRIEF DESCRIPTION OF THE DRAWINGS

Detailed descriptions of implementations of the present technology will be described and explained through the use of the accompanying drawings.

Figure 1:
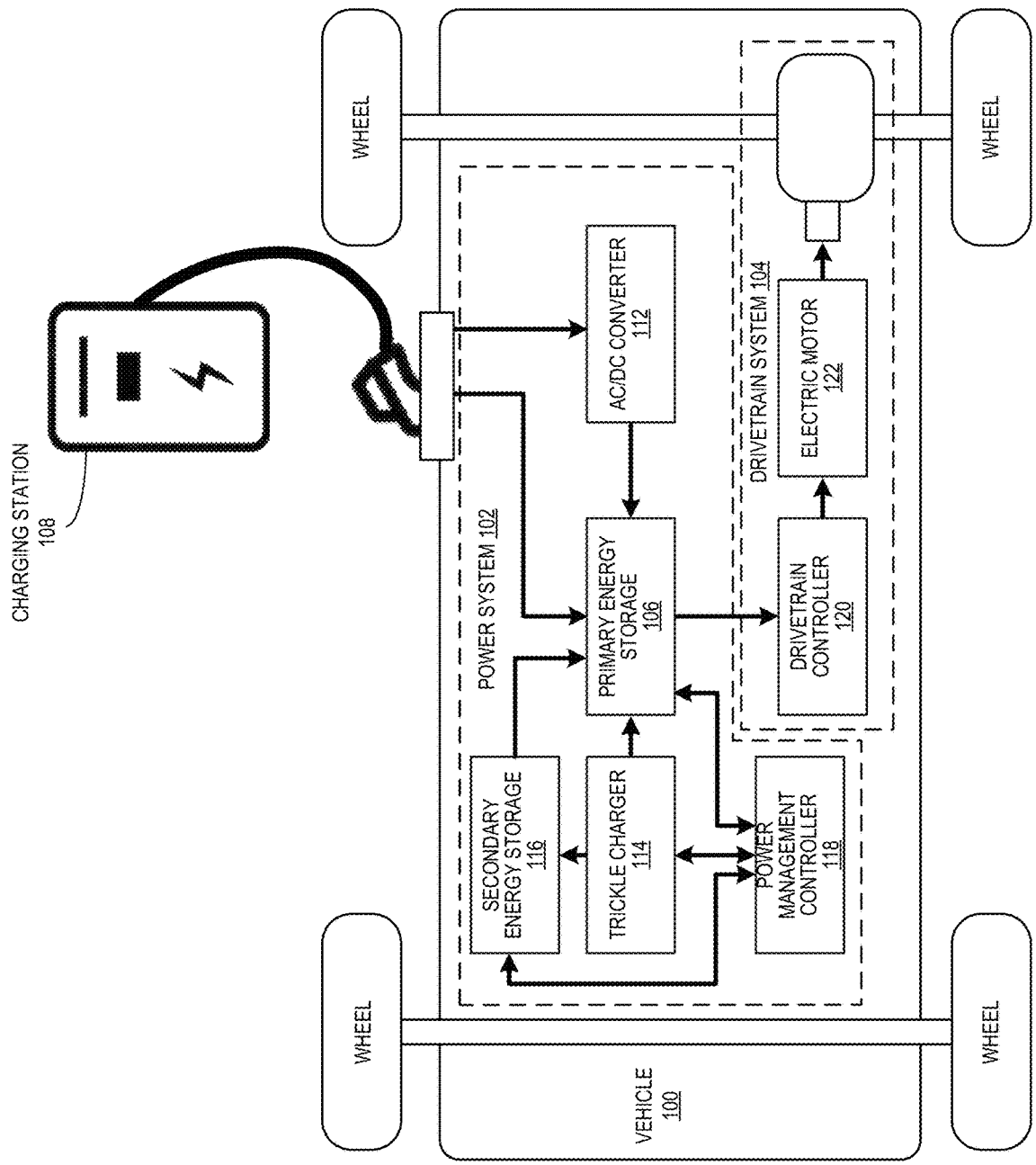
FIG. 1 is a block diagram that illustrates systems of an electric vehicle (EV) including a self-contained trickle charger.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology relates to using a self-contained (e.g., independent) source of energy as a secondary charging source that provides a trickle-charge to a primary source of electric power for an electric vehicle (EV). An EV battery typically needs to be plugged into a main electric power supply for recharging in order to maximize driving range. Recharging an EV can be done at different types of charging stations; these charging stations can be installed in private homes, parking garages, and public areas. There are also research and development in other technologies such as battery swapping and inductive charging. As the recharging infrastructures (especially those with fast chargers) are still in its relative infancy, range anxiety and time cost are frequent psychological obstacles against electric cars during consumer purchasing decisions.

The disclosed technology addresses these problems with a self-contained source of power that provides a trickle charge to one or more batteries of an EV that are used to power the drivetrain or another system or component of the EV. The self-contained source is a closed source, meaning that it is not rechargeable but can instead provide a constant source of energy on-demand or in accordance with a schedule or in response to a status of other batteries. In one example, the EV includes a charge management system that improves the drive range of existing EV batteries by managing a trickle charge function that charges a secondary battery (e.g., backup) coupled to a primary battery that powers the drivetrain. An example of the self-contained source of power includes a betavoltaic device or battery, which is a type of nuclear battery that generates electric current from beta particles (electrons) emitted from a radioactive source, using semiconductor junctions. An example source includes the hydrogen isotope tritium. Unlike most nuclear power sources that use nuclear radiation to generate heat which then is used to generate electricity, betavoltaic devices use a non-thermal conversion process, converting the electron-hole pairs produced by the ionization trail of beta particles traversing a semiconductor. The technology disclosed herein to use a self-contained source of energy to trickle-charge a battery of an EV can therefore mitigate climate change by reducing and/or preventing greenhouse gas emissions into the atmosphere compared to the use of conventional (e.g., fossil fuel) sources of energy.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Batteries for Electric Vehicles

FIG. 1 is a block diagram that illustrates systems of an electric vehicle (EV) configured to utilize trickle charging. As shown, the vehicle 100 houses a power system 102 and a drivetrain system 104. Examples of the vehicle 100 include an all-electric vehicle, plug-in hybrid electric vehicle (PHEV), or a hybrid electric vehicle (HEV). The power system 102 includes a primary energy storage 106 such as a lithium-ion battery, nickel-metal hydride battery, lead-acid battery, ultracapacitor, or other type of battery that is rechargeable using an external source such as a charging station 108. The power system 102 includes an AC/DC converter 112 configured to receive AC from the charging station 108 and supply DC power to the primary energy storage 106. The power system 102 includes a trickle charger 114 that can charge the primary energy storage 106 and/or a secondary energy storage 116. A power management controller 118 can monitor and control the primary energy storage 106, the secondary energy storage 116, and the trickle charger 114 to dynamically improve the range and effectiveness of the power system 102. The drivetrain system 104 moves the wheels and various parts of the vehicle 100 to drive into motion. In particular, the drivetrain system 104 includes a drivetrain controller 120 that controls the power to the electric motor 122. The primary energy storage 106 furnishes power to the drivetrain controller 120 to power the electric motor 122.

An example of the energy storage devices includes one or more lithium-ion batteries, which are currently used in most portable consumer electronics such as cell phones and laptops because of their high energy per unit mass and volume relative to other electrical energy storage systems. These types of batteries also have a high power-to-weight ratio, high energy efficiency, good high-temperature performance, long life, and low self-discharge. Most components of lithium-ion batteries can be recycled, but the cost of material recovery remains a challenge for the industry. Most of today's all-electric vehicles and PHEVs use lithium-ion batteries, though the exact chemistry can vary from that of consumer electronics batteries. Research and development are ongoing to reduce their relatively high cost, extend their useful life, use less cobalt, and address safety concerns in regard to various fault conditions.

Another example of energy storage devices includes one or more nickel-metal hydride batteries, which offer reasonable specific energy and specific power capabilities. Nickel-metal hydride batteries have a much longer life cycle than lead-acid batteries and are safe and abuse tolerant. These batteries have been widely used in HEVs. The main challenges with nickel-metal hydride batteries are their high cost, high self-discharge rate, heat generation at high temperatures, and the need to control hydrogen loss.

Another example of energy storage devices includes one or more lead-acid batteries that can be designed for high power and are inexpensive, safe, recyclable, and reliable. However, low specific energy, poor cold-temperature performance, and short calendar and lifecycle can impede their use. Advanced high-power lead-acid batteries are used in commercially available electric-drive vehicles for ancillary loads.

Another example of energy storage devices includes one or more ultracapacitors, which store energy in the interface between an electrode and an electrolyte when voltage is applied. Energy storage capacity increases as the electrolyte-electrode surface area increases. Although ultracapacitors have low energy density, they have very high-power density, which means they can deliver high amounts of power in a short time. Ultracapacitors can provide the vehicle 100 additional power during acceleration and hill climbing and help recover braking energy. They are useful as secondary energy storage devices (e.g., secondary energy storage 116) in electric-drive vehicles because they help electrochemical batteries level load power.

The primary energy storage 106 of the vehicle 100 is rechargeable using the charging station 108, which is also known as a charge point or electric vehicle supply equipment (EVSE). The charging station 108 is a power supply device that supplies electrical power for recharging plug-in electric vehicles (including plug-in hybrid vehicles). There are two main types of charging stations: alternating current (AC) and direct current (DC) charging stations. Electric vehicle batteries can only be charged by direct current electricity, while most mains electricity is delivered from the power grid as alternating current. For this reason, EVs have a built-in AC-to-DC converter (e.g., AC/DC converter 112) commonly known as the "onboard charger." As such, at an AC charging station, electric current from the grid is supplied to the onboard charger, which converts the AC into DC to then recharge the primary energy storage 106. DC charging stations facilitate higher power charging, which require much larger AC/DC converters by building the converter into the charging station instead of the vehicle to avoid size and weight restrictions. The charging station 108 then supplies DC power directly to the vehicle 100, bypassing the onboard converter. Most modern electric car models can accept both AC and DC power.

Charging stations (e.g., charging station 108) provide connectors that conform to a variety of international standards. DC charging stations are commonly equipped with multiple connectors to be able to charge a wide variety of vehicles that utilize competing standards. Public charging stations are typically found street-side or at retail shopping centers, government facilities, and other parking areas. Private charging stations are typically found at residences, workplaces, and hotels.

The trickle charger 114 is an example of an autonomous, self-contained, and independent charging source that can charge the primary energy storage 106 or the secondary energy storage 116 of the vehicle 100. In one example, the trickle charger 114 includes a betavoltaic battery, which is a type of nuclear battery that generates electric current from beta particles (electrons) emitted from a radioactive source, using semiconductor junctions. An example source is the hydrogen isotope tritium. Unlike most nuclear power sources that use nuclear radiation to generate heat which then is used to generate electricity, betavoltaic devices use a non-thermal conversion process, converting the electron-hole pairs produced by the ionization trail of beta particles traversing a semiconductor. In another example, the betavoltaic battery powers the trickle charger 114, as a separate standalone device that is electrically coupled to the trickle charger 114.

The power management controller 118 can include a combination of hardware and software that is configured to monitor and manage operations of any of the primary energy storage 106, the secondary energy storage 116, and the trickle charger 114. For example, the power management controller 118 can schedule days or times when the trickle charger 114 is allowed or activated to charge the primary energy storage 106. That is, the power management controller 118 can control the times and duration of trickle charging of the primary energy storage 106 or the secondary energy storage 116. The times and duration can be set manually or activate automatically in response to events that affect the power system 102. In one example, trickle charger 114 can continuously provide a charge to the primary energy storage 106; however, continuous charging could impair performance of the primary energy storage 106. The power system 102 can include a physical gateway or conductive bridge that is controlled by the power management controller 118 to enabled or disable trickle charging from the trickle charger 114 to the primary energy storage 106 or the secondary energy storage 116 at time that are optimal for enhancing performance of the vehicle 100.

In one example, the power management controller 118 activates trickle charging when the charge capacity of the primary energy storage 106 is at or less than a lower threshold value (e.g., 50%) and is deactivated when the charge capacity of the primary energy storage 106 is at or greater than an upper threshold value, which could be less than a maximum capacity of the primary energy storage 106. For example, the trickle charger 114 would not charge the primary energy storage 106 at or above 80%, which is less than the 100% maximum. As such, a user can ensure that an EV battery's charge does not exceed 80%, which could degrade performance of the battery. Alternatively, trickle charging can be activated to charge the primary energy storage 106 to a maximum charge after being charged to a desired value using a charging station. In particular, as the primary energy storage 106 reaches its maximum capacity of 100%, charging speed slows down because electrons injected into the battery have to work harder to find space. Hence, if charging using a charging station stops at 80%, the slowest rate is avoided. Instead, the power management controller 118 can activate the trickle charger 114 when the battery reaches the preset charge value (e.g., 80%), thereby providing extended range with additional charge provided by the trickle charger 114 without needing to be connected to the charging station 108.

In another example, the power management controller 118 activates or deactivates trickle charging in response to navigation or driving activities. For example, the power management controller 118 can activate trickle charging when a programmed route exceeds a threshold distance value (e.g., navigation route exceeds 300 miles) to increase the driving range without needing to recharge at a charging station. The trickle charger 114 can also respond to the location of the vehicle 100. The trickle charger 114 can also activate when a programmed route includes a rural segment or a region with sparsely located charging stations. In an example, the power management controller 118 can activate trickle charging when the vehicle 100 is idle, while temporarily stopped or parked. In another example, the power management controller 118 activates trickle charging based on a schedule such as only overnight, during certain days of the week, or at other preset times.

In another example, the power management controller 118 activates or deactivates trickle charging in response to vehicle operating conditions. For example, the power management controller 118 can activate the trickle charger 114 during preconditioning, which allows a user to remotely activate a vehicle's climate control, ensuring a comfortable interior temperature when a driver enters the vehicle. Additionally, preconditioning warms up batteries, optimizing driving range and extending battery life. As such, the trickle charger 114 can charge the primary energy storage 106 during preconditioning to further extend range and battery life.

In another example, the trickle charger 114 is configured to charge the secondary energy storage 116 (e.g., backup or auxiliary power) instead of or in addition to the primary energy storage 106. The secondary energy storage 116 can operate as a backup battery that powers the primary energy storage 106 when depleted or powers devices other than the electric motor 122. For example, the secondary energy storage 116 can power an infotainment system or climate system to reduce the utilization of the primary energy storage 106 to power systems other than the drivetrain system. In another example, the power system 102 of the vehicle 100 includes multiple trickle chargers connected in parallel or serially to increase the trickle charging to a primary or secondary energy storage devices.

Figure 2:
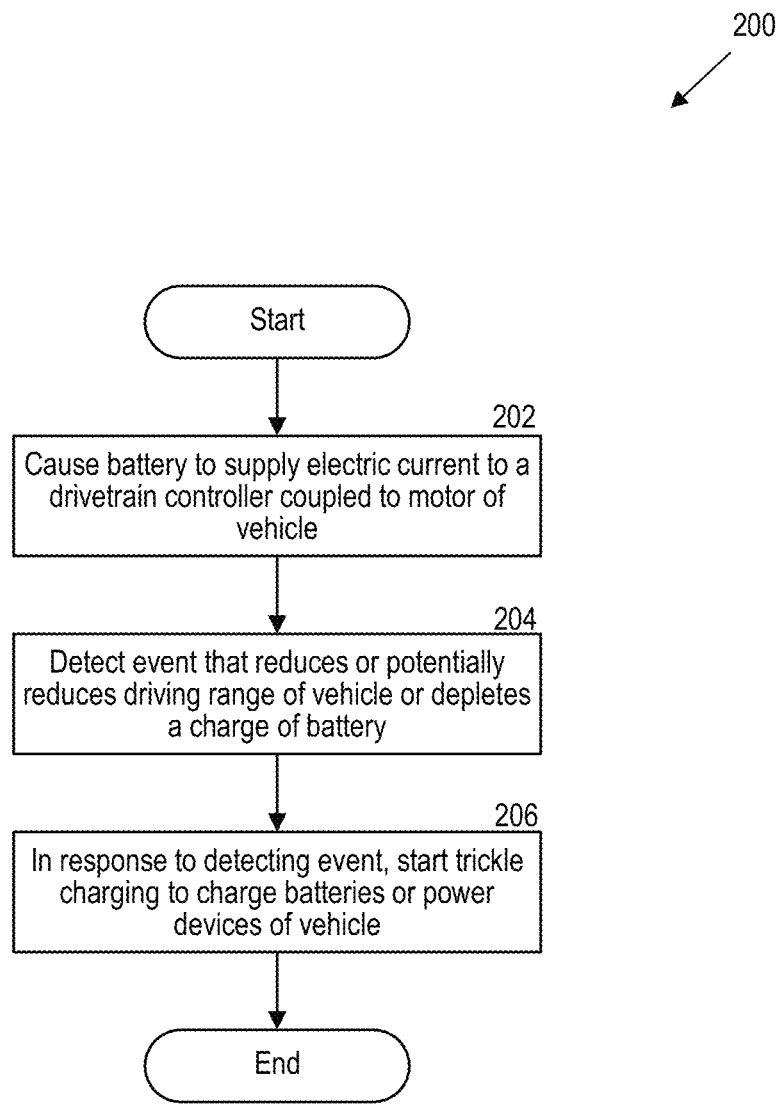
FIG. 2 is a flowchart that illustrates processes of a power system including a trickle charger.

FIG. 2 is a flowchart that illustrates processes 200 of a power system including a trickle charger. The processes 200 can be performed by a system or device that is powered by a rechargeable battery. In one example, an EV includes a drivetrain system and a power system (see, e.g., FIG. 1). The drivetrain system includes an electric motor configured to supply motive power to the EV, and a drivetrain controller configured to control electrical power supplied to the electric motor. The power system includes a primary energy storage device including one or more cells (e.g., batteries) configured to supply electric current to the drivetrain controller of the drivetrain system. The primary energy storage device is configured for recharging from an external source (e.g., charging station).

The power system includes a trickle charger device configured to supply a trickle charge to one or more components of the EV, where the trickle charger device is a self-contained source of electric current that is generated autonomously and is not rechargeable (e.g., a betavoltaic device). The trickle charger device can be configured to charge the secondary energy storage device rather than or in addition to the primary energy storage, where the secondary energy storage device operates as a backup battery or operates to charge or power other devices of the EV. In an implementation, multiple trickle charger devices are coupled together and configured to charge the primary or secondary energy storage devices. The power system includes a power management controller configured to manage electric current supplied from the trickle charger device to the power system.

At 202, a system causes a primary energy storage device to supply electric current to a drivetrain controller coupled to a motor of the vehicle. The primary energy storage device is rechargeable from a charging station. In one example, the power management controller can monitor operations of the primary energy storage device, the secondary energy storage device, and/or the trickle charger device, and schedule times or periods when the trickle charger device is activated to charge the primary or secondary energy storage devices.

At 204, the system detects an event at the vehicle that reduces or potentially reduces a driving range of the vehicle or depletes a charge of an energy storage device. In one example, the system determines that a state of charge of a primary battery is below a lower threshold value. The trickle charger is configured to charge the primary battery while the state of charge remains below the lower threshold value. In another example, the system detects start of a preconditioning mode of the vehicle. The preconditioning can include activating a climate control of the vehicle and heating the primary battery prior to powering the motor of the vehicle. Alternatively, the trickle charger device can continuously provide a trickle charge to the primary energy storage device or the secondary energy storage device.

At 206, in response to detecting the event, the system causes trickle charging of the primary energy storage device that powers the motor of the vehicle or a secondary energy storage device that powers a component of the vehicle other than the motor. In one example, a secondary energy storage device is configured to receive the trickle charge, where the secondary energy storage device is configured to supply electric current to the primary energy storage device or to a component external to the power system of the EV.

In an implementation, the power management controller can be configured to activate trickle charging when a charge capacity of the primary energy storage device satisfies a lower value greater than a minimum capacity and deactivates when the charge capacity satisfies and upper threshold value less than a maximum capacity of the primary energy storage device. In other examples, the system detects that a programmed navigation route for the vehicle is expected to exceed a threshold distance or includes an area with sparsely located charging stations. In response, the system activates trickle charging to charge the primary or secondary energy storage devices. In another example, the system detects a particular operating condition or driving operation (e.g., idle state) and, in response, activates trickle charging of the primary or secondary energy storage devices.

Although embodiments described herein include vehicles, the technology can be implemented in any system that includes a primary battery configured to supply power to a standalone device, where the primary battery is configured for recharging from a source external to the standalone device. A trickle charger device can be configured to supply a trickle charge to one or more components (e.g., the primary battery) of the standalone device, where the trickle charger is a self-contained, independent, and closed source of electric current that is generated autonomously and is not rechargeable. The system includes a controller configured to monitor a state of charge of the primary battery and manage power supplied from the trickle charger to the primary battery or a secondary battery.

Computer System

Figure 3:
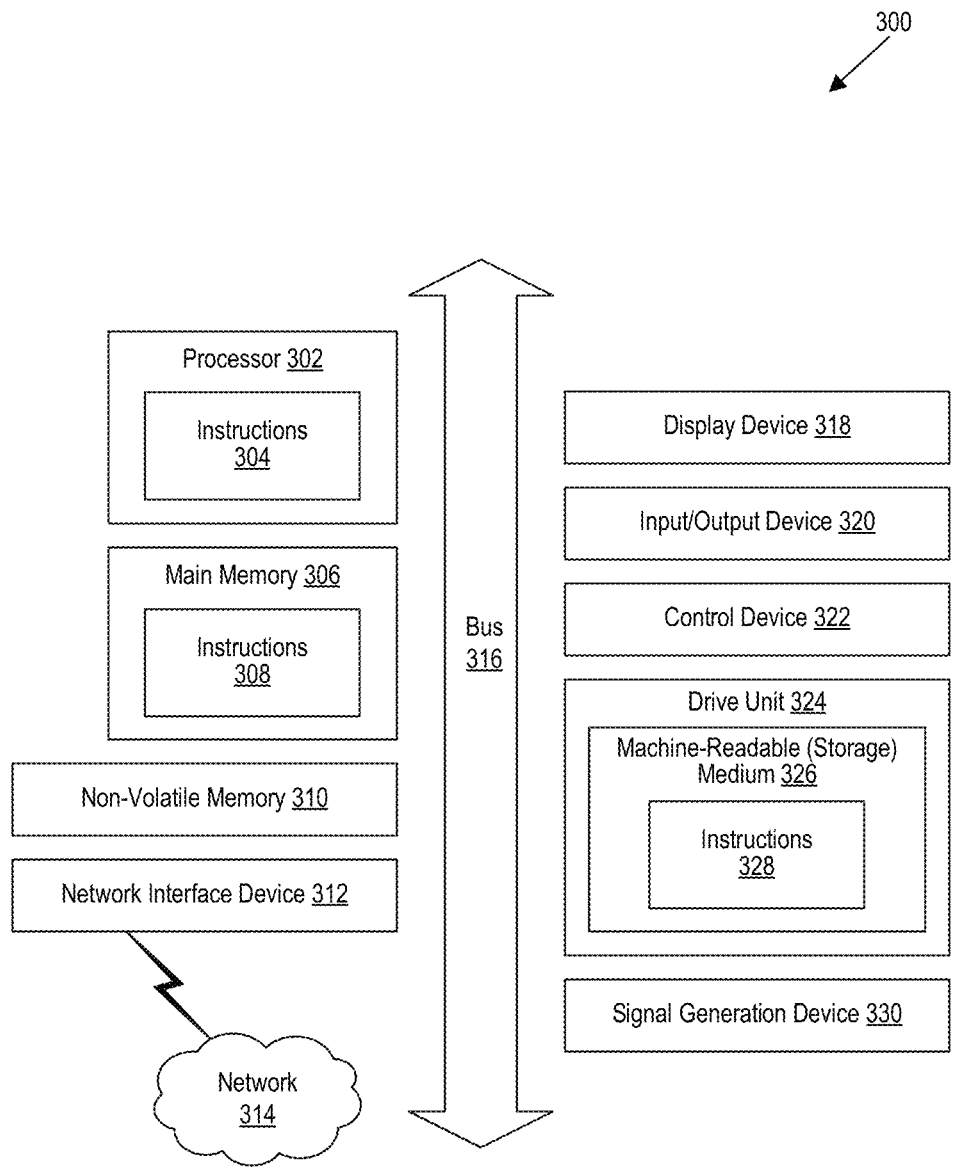
FIG. 3 is a block diagram that illustrates a computer system in which at least some operations described herein can be implemented.

FIG. 3 is a block diagram that illustrates an example of a computer system 300 in which at least some operations described herein can be implemented. As shown, the computer system 300 can include one or more processors 302, main memory 306, non-volatile memory 310, a network interface device 312, a display device 318, an input/output device 320, a control device 322 (e.g., keyboard and pointing device), a drive unit 324 that includes a storage medium 326, and a signal generation device 330 that are communicatively connected to a bus 316. The bus 316 represents one or more physical buses and/or point-to-point connections that are connected by appropriate bridges, adapters, or controllers. Various common components (e.g., cache memory) are omitted from FIG. 3 for brevity. Instead, the computer system 300 is intended to illustrate a hardware device on which components illustrated or described relative to the examples of the figures and any other components described in this specification can be implemented.

The computer system 300 can take any suitable physical form. For example, the computer system 300 can share a similar architecture as that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computer system 300. In some implementations, the computer system 300 can be an embedded computer system, a system-on-chip (SOC), a single-board computer (SBC) system, or a distributed system such as a mesh of computer systems or include one or more cloud components in one or more networks. Where appropriate, one or more computer systems 300 can perform operations in real time, near real time, or in batch mode.

The network interface device 312 enables the computer system 300 to mediate data in a network 314 with an entity that is external to the computer system 300 through any communication protocol supported by the computer system 300 and the external entity. Examples of the network interface device 312 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 306, non-volatile memory 310, machine-readable medium 326) can be local, remote, or distributed. Although shown as a single medium, the machine-readable medium 326 can include multiple media (e.g., a centralized/distributed database and/or associated caches and servers) that store one or more sets of instructions 328. The machine-readable (storage) medium 326 can include any medium that is capable of storing, encoding, or carrying a set of instructions for execution by the computer system 300. The machine-readable medium 326 can be non-transitory or comprise a non-transitory device. In this context, a non-transitory storage medium can include a device that is tangible, meaning that the device has a concrete physical form, although the device can change its physical state. Thus, for example, "non-transitory" refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 310, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 304, 308, 328) set at various times in various memory and storage devices in computing device(s). When read and executed by the processor 302, the instruction(s) cause the computer system 300 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative combinations or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. An electric vehicle (EV) comprising:
   a drivetrain system including:
   an electric motor configured to supply motive power to the EV; and
   a drivetrain controller configured to control electrical power supplied to the electric motor;
   a power system including:
   a primary energy storage device including one or more cells configured to supply electric current to the drivetrain controller of the drivetrain system,
   wherein the primary energy storage device is configured for recharging from a source external to the EV;
   a trickle charger device configured to supply a trickle charge to one or more components of the power system,
   wherein the trickle charger device is a self-contained source of electric current that is generated autonomously and is not rechargeable; and
   a power management controller configured to manage electric current supplied from the trickle charger device to the power system of the EV.

2. The EV of claim 1, wherein the power system further comprises:
   a secondary energy storage device configured to receive the trickle charge supplied from the trickle charger of the power system,
   wherein the secondary energy storage device is configured to supply electric current to the primary energy storage device.

3. The EV of claim 1, wherein the power system further comprises:
   a secondary energy storage device configured to receive the trickle charge supplied from the trickle charger of the power system,
   wherein the secondary energy storage device is configured to supply electric current to a component external to the power system of the EV.

4. The EV of claim 1, wherein the trickle charger device comprises:
   a betavoltaic device configured to generate electric current from beta particles emitted from a radioactive source by using semiconductor junctions, thereby having no carbon emissions and reducing or avoiding overall emissions of the EV.

5. The EV of claim 1, wherein the power system further comprises:
   an alternating current to direct current (AC-to-DC) converter configured to receive AC power from a charging station and supply DC power to charge the primary energy storage device.

6. The EV of claim 1, wherein the power management controller is caused to:
   monitor operations of at least one of the primary energy storage device, a secondary energy storage device, or the trickle charger device, and
   schedule times or periods when the trickle charger device is activated to charge the primary energy storage device or the secondary energy storage device.

7. The EV of claim 1:
   wherein the trickle charger device is configured to continuously provide a trickle charge to the primary energy storage device or a secondary energy storage device, and
   wherein the secondary energy storage device is configured to power one or more components of the EV other than any components of the drivetrain system.

8. The EV of claim 1, wherein the power management controller is configured to:
   activate trickle charging when a charge capacity of the primary energy storage device satisfies a lower value greater than a minimum capacity, and
   deactivate trickle charging when the charge capacity of the primary energy storage device satisfies an upper threshold value less than a maximum capacity of the primary energy storage device.

9. The EV of claim 1, wherein the power management controller is caused to:
   detect that a programmed navigation route for the EV is expected to exceed a threshold distance; and
   in response to detecting that the programmed navigation route exceeds the threshold distance, activate trickle charging to charge the primary energy storage device.

10. The EV of claim 1, wherein the power management controller is caused to:
    detect that a programmed navigation route includes an area with sparsely located charging stations; and
    in response to detecting that the programmed navigation route includes the area with sparsely located charging stations, activate trickle charging to charge the primary energy storage device.

11. The EV of claim 1, wherein the power management controller is caused to:
    detect that a driving operation of the EV is in an idle state; and
    in response to detecting that the EV is in the idle state, activate trickle charging to charge the primary energy storage device or to charge a secondary energy storage device.

12. The EV of claim 1, wherein the power management controller is caused to:
    activate trickle charging based on a schedule indicating times and durations.

13. The EV of claim 1, wherein the power management controller is caused to:
    detect an operating condition of the EV; and
    in response to detecting the operating condition of the EV, activate trickle charging to charge the primary energy storage device or a secondary energy storage device.

14. The EV of claim 1, wherein the trickle charger device is configured to:
    charge a secondary energy storage device rather than or in addition to the primary energy storage device,
      wherein the secondary energy storage device operates as a backup battery that powers the primary energy storage device when depleted.

15. The EV of claim 1, wherein the trickle charger device is configured to:
    charge a secondary energy storage device rather than the primary energy storage device,
      wherein the secondary energy storage device operates to charge devices of the EV other than the primary energy storage device.

16. The EV of claim 1 further comprising:
    multiple trickle charger devices coupled together and configured to charge the primary energy storage device or a secondary energy storage device.

17. A method for trickle charging a battery of a vehicle, the method comprising:
    causing a primary battery to supply electric current to a drivetrain controller coupled to a motor of the vehicle, wherein the primary battery is rechargeable with a charging station external to the vehicle;
    detecting an event at the vehicle that reduces or potentially reduces a driving range of the vehicle or depletes a charge of the primary battery; and
    in response to detecting the event, causing a trickle charger to trickle charge the primary battery that powers the motor of the vehicle or a secondary battery configured to power a component of the vehicle other than the motor,
      wherein the trickle charger is a self-contained source of electric current that is generated autonomously and is not rechargeable.

18. The method of claim 17, wherein detecting the event at the vehicle comprises:
    determining that a state of charge of the primary battery is below a lower threshold value,
      wherein the trickle charger is configured to charge the primary battery while the state of charge remains below the lower threshold value.

19. The method of claim 17, wherein detecting the event at the vehicle comprises:
    detecting start of a preconditioning mode of the vehicle, wherein preconditioning includes activating a climate control of the vehicle and heating the primary battery prior to powering the motor of the vehicle.

20. A standalone device including comprising:
    a primary battery configured to supply power to the standalone device,
      wherein the primary battery is configured for recharging from a source external to the standalone device;
    a trickle charger device configured to supply a trickle charge to one or more components of the standalone device,
      wherein the trickle charger is a closed source of electric current that is generated autonomously and is not rechargeable; and
    a controller configured to monitor a state of charge of the primary battery and manage power supplied from the trickle charger to the primary battery or a secondary battery.

* * * * *